(No Model.)
W. H. PAGE.
AUTOMATIC PROTECTING FENDER FOR CITY RAILWAY CARS.
No. 535,221. Patented Mar. 5, 1895.
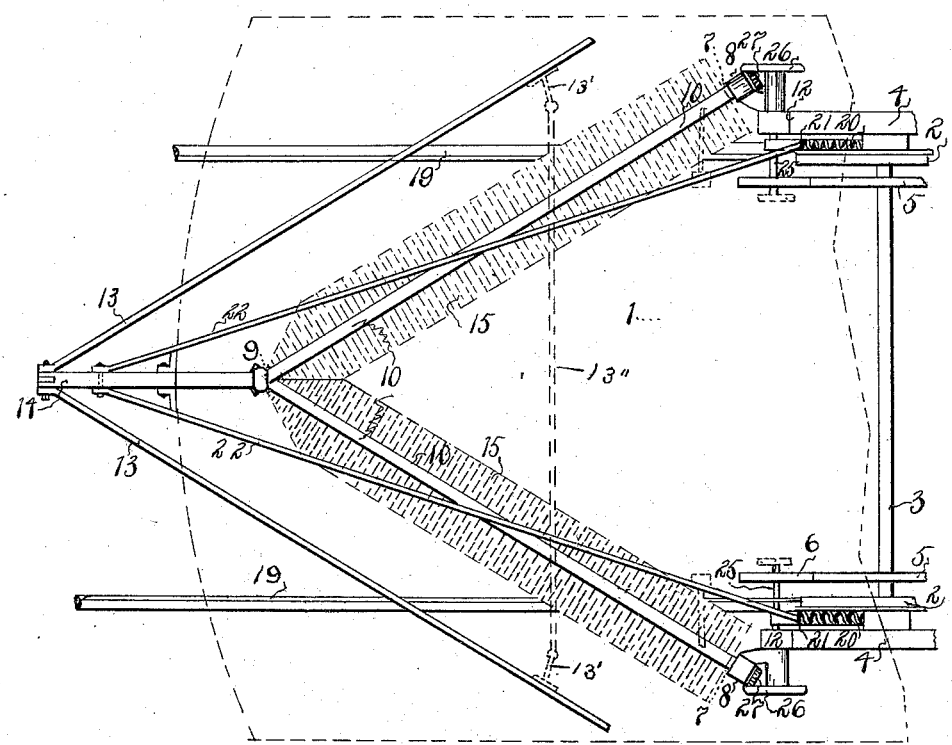
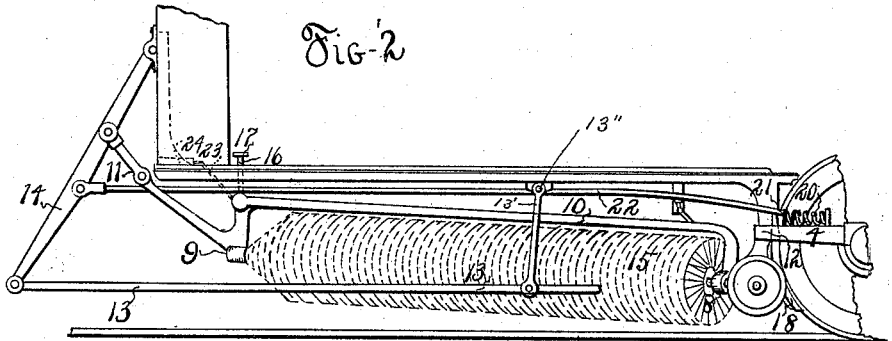
WITNESSES:
J. Daniel Eby
Lucey D. Cadwallader
INVENTOR
Wm. H. Page
by J. Lloyd Wiegand,
Atty

UNITED STATES PATENT OFFICE.

WILLIAM H. PAGE, OF BURLINGTON, NEW JERSEY.

AUTOMATIC PROTECTING-FENDER FOR CITY RAILWAY-CARS.

SPECIFICATION forming part of Letters Patent No. 535,221, dated March 5, 1895.

Application filed August 20, 1894. Serial No. 520,856. (No model.)

*To all whom it may concern:*

Be it known that I, WILLIAM H. PAGE, a citizen of the United States, residing at Burlington, in the county of Burlington and State of New Jersey, have invented certain new and useful Improvements in Automatic Protecting-Fenders for City Railway-Cars; and I do hereby declare the following to be a sufficiently full, clear, and exact description thereof as to enable others skilled in the art to make and use the said invention.

This invention relates to guards for passenger railways upon thoroughfares open to other travel, and has for its object the defending of persons upon the roadway from injury by such vehicles, and the clearing of obstructions from the tracks and roadway, and is specially applicable to cars propelled by electric or other motors.

The nature of this invention consists in a series of revolving brushes or rollers provided with elastic projections which turn forwardly at the lower side and upwardly at their forward side, so as to throw anything from the track, or path of the car outwardly toward the side of the road, such rollers being propelled by mechanism connected with the rotating axle of the car, and susceptible of a rising and falling motion, so that under their normal condition they shall be above the roadway, but by means of an automatic attachment hereinafter described they descend instantly to the ground, upon any obstruction contacting with a guard, and at the same time suspend the propelling force and apply the brakes.

Connected with this device is a mechanism by which the driver of the car can at will bring the revolving brushes into contact with the roadway and thereby clean the roadway of snow or other obstructions too low to make contact with the guard.

The construction and operation of this invention are hereinafter fully described, and shown, in the accompanying drawings, in which—

Figure 1 shows a partial plan view of this invention as applied to a car; Fig. 2, an elevation thereof, and Fig. 3 an enlarged partial view of the gearing for transmitting motion from the car axle to the revolving brushes.

1 represents the car-body; 2, the wheels thereof; 3, the axle; 4, the truck frame; 5, a toothed wheel upon the axle 3, engaging a pinion 6, on a shaft 25 bearing toothed wheels 26 engaging in pinions 27 upon an arbor 7, supported in bearings 8 and 9 in a frame 10, pivotally attached to the truck-frame 4, and susceptible of a rising and falling motion by links 11, connected with the front portion of the frame 10, suspending it from the body of the car 1, or from the projecting part 12 attached to the truck-frame 4.

A guard 13 is secured to arms 14 at the front portion of the suspending links 11, which guard consists of a bar 13 on each side of the car suspended by pendulous links 13' on each side of the car having a pivotal support or shaft 13'' extending across the car and attached thereto. The pivotal attachment of the frame 10 is concentric with the shaft 25 so that the wheels 26 and 27 are constantly held in the same relative position of axes. The wheel 26 is of an internal or concave bevel form which permits of coarser and stronger teeth and is capable of driving smoothly the pinion 27 with a small number of teeth because more teeth are engaged at the same time than in convex faced gearing. This guard 13 traverses near the ground and any object pressing upon the guard causes the links 11, to turn rearwardly toward the car and lowers the frame 10, so as to cause it to approach the ground.

Upon each of the arbors 7, there is placed a brush 15, which may be made of rattan or coir grass, such as is employed for stable and street sweeping brooms, as shown in Fig. 3, or from vulcanized rubber, or steel wires with a covering of rubber, or they may be made of rubber in the form of continuous helical flanges. A lever 16, provided with a treadle 17, within reach of the foot of the driver, when depressed forces the frame 10, downwardly, so that the driver can at will enforce a sweeping or brushing by the brushes 15, upon the roadway.

Any object upon the roadway meeting the guard 13 forces the frame 10 downwardly, and causes rotating brushes 15, to make contact with the roadway and brush or roll upwardly and outwardly such object as may make contact with them. Thus while in normal position avoiding contact with the roadway and the consequent friction and resistance to motion upon meeting any object or person obstructing the roadway, the revolving brushes 15, brush or roll such object out of the path of the car, and in the event of a fall of snow occurring while cars provided with this apparatus are in transit, the cars may be made by this apparatus to clear the track, and if the road is much traveled to maintain a clear track without the assistance of other snow cleaning mechanism.

A brake 18 pressed toward the wheels 2 or against the track 19 by springs 20 is restrained from making contact with the wheels 2 or track 19 by a latch 21, connected by a link 22, with the links 11 so that when the frame 10 descends the brake is at the same moment automatically applied.

Instead of a latch 21 and spring 19 to liberate and operate the brake, a fluid pressure operated piston, and controlling valve operated from the frame 10 may be substituted.

Connected with the frame 10 by a link 23 is a switch 24 by which the electric circuit to the motor is interrupted and the rheostat, or current controlling device, is returned to a position for restarting the motor so that obstructions which escape the vigilance of the driver automatically arrest the motion of the car as well as clear them from the track.

Having described this invention and the operation thereof, what I claim is—

1. In a railway car fender rotating brushes 15 arbors supporting and turning said brushes disposed diagonally to the line of the track a frame 10 containing bearings supporting said arbors the described gearing for rotating said arbors in combination with a pivoted support concentric with the arbor 25 and a link 11 and connected lever 14 and fender 13 arranged to automatically lower said frame 10 and brushes and a spring 20 and 22 to support said frame and brushes substantially as set forth.

2. A railway car truck, or car provided with diagonally disposed rotating brushes closely converging at the front ends thereof forward of the wheels; mechanism, connected with the rear ends thereof for rotating such brushes, the links 14 and 11 and frame 10 forming a suspending mechanism for holding such brushes normally above the roadway, in combination with suspending links provided with a guard attached thereto and arranged to lower said brushes upon an approaching obstruction, and a push pin arranged to depress such brushes at the will of the driver, substantially as and for the purposes set forth.

WM. H. PAGE.

Witnesses:
C. R. MORGAN,
HAROLD R. PRINDLE.